United States Patent
Epstein

(10) Patent No.: US 8,107,627 B2
(45) Date of Patent: Jan. 31, 2012

(54) TEMPORAL PROXIMITY TO VERIFY PHYSICAL PROXIMITY

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/207,864

(22) Filed: Sep. 10, 2008

(65) Prior Publication Data

US 2009/0003605 A1 Jan. 1, 2009

Related U.S. Application Data

(62) Division of application No. 09/894,391, filed on Jun. 28, 2001.

(51) Int. Cl.
*H04L 9/32* (2006.01)
*G06F 21/00* (2006.01)

(52) U.S. Cl. ............... 380/258; 713/168; 726/27

(58) Field of Classification Search ............ 726/26, 726/29, 35, 27; 713/168, 181, 150, 153; 709/203, 223–225, 238, 241, 245; 380/258, 380/255; 370/238, 252, 397, 313; 455/414.1, 455/414.2; 702/176
See application file for complete search history.

(56) References Cited

U.S. PATENT DOCUMENTS

| | | | |
|---|---|---|---|
| 3,825,947 A | 7/1974 | Rubin et al. | |
| 4,621,334 A | 11/1986 | Garcia | |
| 4,856,062 A | 8/1989 | Weiss | |
| 4,860,352 A * | 8/1989 | Laurance et al. | 380/258 |
| 4,924,378 A | 5/1990 | Hershey et al. | |
| 5,440,719 A | 8/1995 | Hanes et al. | |
| 5,659,617 A | 8/1997 | Fischer | |
| 5,659,619 A | 8/1997 | Abel | |
| 5,724,357 A * | 3/1998 | Derks | 370/313 |
| 5,835,857 A | 11/1998 | Otten | |
| 6,029,259 A | 2/2000 | Sollish | |
| 6,134,591 A | 10/2000 | Nickles | |
| 6,185,682 B1 | 2/2001 | Tang | |
| 6,189,105 B1 | 2/2001 | Lopes | |
| 6,209,092 B1 | 3/2001 | Linnartz | |
| 6,269,084 B1 | 7/2001 | Takei | |
| 6,363,477 B1 * | 3/2002 | Fletcher et al. | 713/151 |
| 6,496,802 B1 | 12/2002 | Van Zoest et al. | |
| 6,542,468 B1 | 4/2003 | Hatakeyama | |
| 6,658,590 B1 | 12/2003 | Sicola et al. | |
| 6,687,735 B1 | 2/2004 | Logston et al. | |
| 6,785,815 B1 | 8/2004 | Serret-Avila et al. | |
| 6,792,461 B1 | 9/2004 | Hericourt | |

(Continued)

FOREIGN PATENT DOCUMENTS

EP 0881799 A2 2/1998

(Continued)

*Primary Examiner* — Gilberto Barron, Jr.
*Assistant Examiner* — Abdulhakim Nobahar

(57) ABSTRACT

A security system assesses the response time to requests for information to determine whether the responding system is in physical proximity to the requesting system. Generally, physical proximity corresponds to temporal proximity. If the response time indicates a substantial or abnormal lag between request and response, the system assumes that the lag is caused by the request and response having to travel a substantial or abnormal physical distance, or caused by the request being processed to generate a response, rather than being answered by an existing response in the physical possession of a user. If a substantial or abnormal lag is detected, the system is configured to limit subsequent access to protected material by the current user, and/or to notify security personnel of the abnormal response lag.

10 Claims, 1 Drawing Sheet

U.S. PATENT DOCUMENTS

| | | |
|---|---|---|
| 6,823,188 B1 | 11/2004 | Stern |
| 6,910,221 B1 * | 6/2005 | Honda ............................ 725/93 |
| 6,954,786 B1 | 10/2005 | Vered et al. |
| 7,197,563 B2 | 3/2007 | Sheymov et al. |
| 7,228,425 B1 | 6/2007 | Staring et al. |
| 7,412,594 B2 | 8/2008 | Bridge |
| 2001/0029832 A1 | 10/2001 | Kanda et al. |
| 2002/0002074 A1 | 1/2002 | White et al. |
| 2002/0023176 A1 | 2/2002 | Kwicinski |
| 2002/0069281 A1 | 6/2002 | Dillenberger et al. |
| 2002/0095399 A1 | 7/2002 | Devine et al. |
| 2002/0111993 A1 | 8/2002 | Reed |
| 2002/0120564 A1 | 8/2002 | Strietzel |
| 2002/0147930 A1 | 10/2002 | Pritchard et al. |
| 2002/0154777 A1 * | 10/2002 | Candelore ..................... 380/258 |
| 2002/0194499 A1 | 12/2002 | Audebert et al. |
| 2003/0184431 A1 * | 10/2003 | Lundkvist ..................... 340/5.2 |
| 2009/0240721 A1 | 9/2009 | Giacalone, Jr. |

FOREIGN PATENT DOCUMENTS

| | | |
|---|---|---|
| EP | 0881799 A2 | 12/1998 |
| EP | 2781076 A1 | 1/2000 |
| EP | 0983916 A1 | 3/2000 |
| EP | 1073244 A1 | 3/2001 |
| WO | 9966510 A1 | 12/1999 |
| WO | 0069111 A3 | 11/2000 |
| WO | 0159705 A2 | 8/2001 |

\* cited by examiner

TEMPORAL PROXIMITY TO VERIFY PHYSICAL PROXIMITY

CROSS-REFERENCE TO RELATED APPLICATIONS

This is a divisional application of co-pending U.S. patent application Ser. No. 09/894,391, filed Jun. 28, 2001.

BACKGROUND OF THE INVENTION

1. Field of the Invention

This invention relates to the field of data protection, and in particular to protecting data from illicit copying from a remote location.

2. Description of Related Art

The protection of data is becoming an increasingly important area of security. In many situations, the authority to copy or otherwise process information is correlated to the physical proximity of the information to the device that is effecting the copying or other processing. For example, audio and video performances are recorded on CDs, DVDs, and the like. If a person purchases a CD or DVD, the person traditionally has a right to copy or otherwise process the material, for backup purposes, to facilitate use, and so on. When the person who purchased the material desires to use the material, it is not unreasonable to assume that the person will have the CD or DVD within physical proximity of the device that will use the material. If, on the other hand, the person does not have proper ownership of the material, it is likely that the person will not have physical possession of the material, and hence, the material will be physically remote from the device that is intended to use the material. For example, the illicit copying or rendering of material from an Internet site or other remote location corresponds to material being physically remote from the device that is used to copy the material.

In like manner, security systems are often configured to verify information associated with a user, such as verifying biometric parameters, such as fingerprints, pupil scans, and the like. In a simpler example, security systems are often configured to process information provided by a user, such as information contained on an identification tag, smartcard, etc. Generally, the information or parameters can be provided easily by an authorized user, because the authorized user is in possession of the media that contains the information. An unauthorized user, on the other hand will often not have the original media that contains the verification information, but may have a system that can generate/regenerate the security information or parameters from a remote location. Similarly, some systems, such as an office LAN, or computers in a laboratory, are configured to be secured by controlling physical access to terminals that are used to access the system. If the user has access to the system, the assumption is that the user is authorized to access the system. Some security measures, such as identification verification, are sometimes employed, but typically not as extensively as the security measures for systems that lack physical isolation.

BRIEF SUMMARY OF THE INVENTION

It is an object of this invention to provide a system or method of preventing the use of material in the absence of evidence that the material is in the physical possession of the user. It is a further object of this invention to prevent the use of material in the presence of evidence that the material is remote from the device that is intended to use the material. It is a further object of this invention to prevent access to systems in the presence of evidence that the user is remote from the system.

These objects and others are achieved by providing a security system that assesses the response time to requests for information. Generally, physical proximity corresponds to temporal proximity. If the response time indicates a substantial or abnormal lag between request and response, the system assumes that the lag is caused by the request and response having to travel a substantial or abnormal physical distance, or caused by the request being processed to generate a response, rather than being answered by an existing response in the physical possession of a user. If a substantial or abnormal lag is detected, the system is configured to limit subsequent access to protected material by the current user, and/or to notify security personnel of the abnormal response lag.

BRIEF DESCRIPTION OF THE DRAWINGS

The invention is explained in further detail, and by way of example, with reference to the accompanying drawing wherein.

Throughout the drawing, the same reference numerals indicate similar or corresponding features or functions.

DETAILED DESCRIPTION OF THE INVENTION

Figure 1:
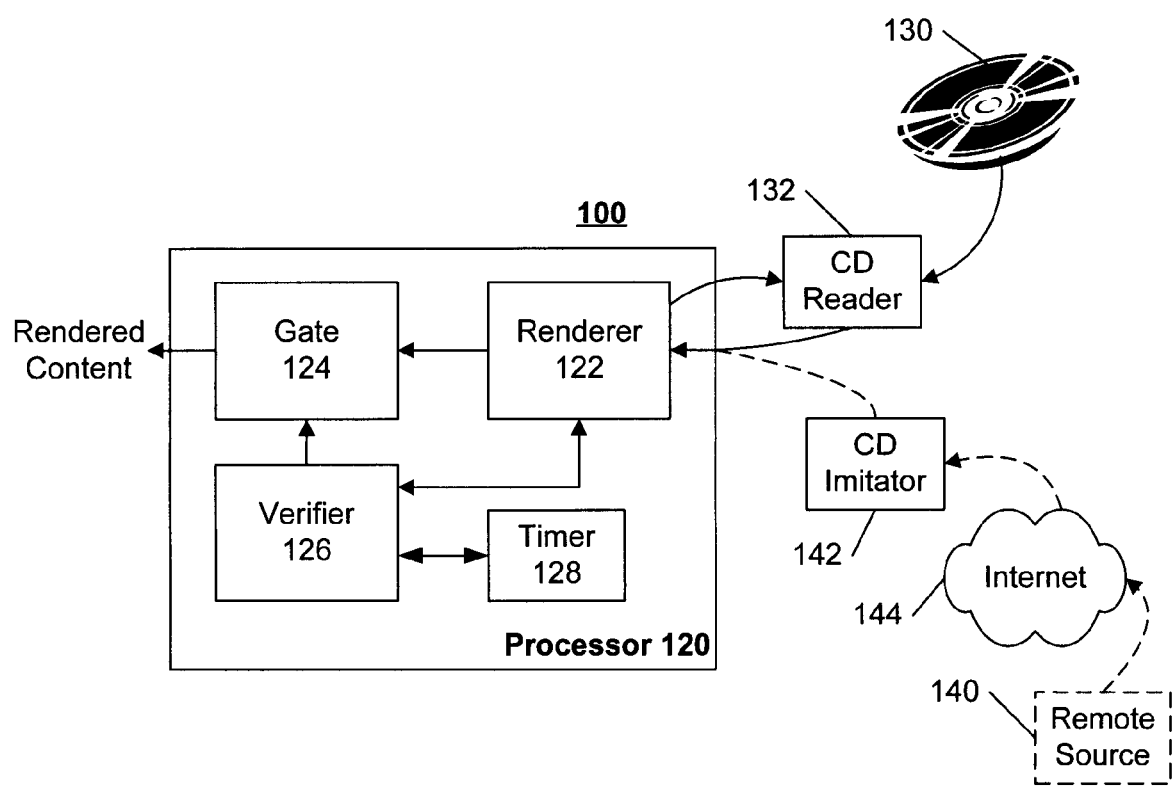
FIG. 1 illustrates an example control access system in accordance with this invention.

For ease of reference and understanding, the invention is presented herein in the context of a copy-protection scheme, wherein the processing of copy-protected material is controlled via a verification that the user of the material is in physical possession of the copy-protected material.

FIG. 1 illustrates an example control access system 100 in accordance with this invention. The control access system 100 includes a processor 120 that is configured to process material from a physical media, such as a CD 130, via an access device, such as a reader 132. The processor 120 may be a recording device that records one or more songs from the CD 130 onto a memory stick, onto a compilation CD, and so on. The processor 120 may also be a playback device that is configured to provide an output suitable for human perception, such as images on a screen, sounds from a speaker, and so on. The term "rendering" is used herein to include a processing, transformation, storage, and so on, of material received by the processor 120. Using this context and terminology, the example processor 120 includes a renderer 122 that provides the interface with the access device 132, and a verifier 126 that is configured to verify the presence of authorized material 130.

When a user commences the rendering of material from the media 130, the processor 120 is configured to verify the presence of the media 130. One method of effecting this verification is to request the access device 132 to provide evidence that the media 130 is available to provide material or information that differs from the material that the user is attempting to render. For example, if the user commences the rendering of a song, the verifier 126 may direct the renderer 122 to request a portion of a different song from the access device 132. If the access device is unable to provide the requested portion of a different song, the verifier 126 can conclude that the media 130 is not actually present for rendering, and will terminate subsequent rendering of the material that the user intended to render, via the gate 124. For example, a user may illicitly download a selection of different copy-protected songs from a remote site 140 on the Internet 144, and then attempt to create a compilation CD containing these user-selected songs. Typically, the size of an entire album of material discourages the downloading of each album that contains the user-selected songs. When the verifier 126 requests a portion of a different song from the album corresponding to an actual CD 130, the user who downloaded only the user-selected song from the album will be prevented from further rendering of the downloaded material.

A variety of techniques may be employed to assure that the material provided in response to the request corresponds to the material that is contained on the actual CD 130. For example, copending U.S. patent application "Protecting Content from Illicit Reproduction by Proof of Existence of a Complete Data Set via Self-Referencing Sections", U.S. Ser. No. 09/536,944, filed 28 Mar. 2000 for Antonius A. M. Staring, Michael A. Epstein, and Martin Rosner, and incorporated by reference herein, teaches a self-referential data set wherein each section of a data set, such as a copy-protected album, is uniquely identified by a section identifier that is securely associated with each section. To assure that a collection of sections are all from the same data set, an identifier of the data set is also securely encoded with each section. Using exhaustive or random sampling, the presence of the entirety of the data set is determined, either absolutely or with statistical certainty, by checking the section and data-set identifiers of selected sections.

The verification provided by the verifier 126 as described above can be defeated, however, by responding to the requests from the renderer 122 from the remote site 140 that contains the entirety of the album. That is, rather than downloading the entire album from the remote site 140, the illicit user need only download the desired song, and imitate the presence of the actual CD 130 by providing a CD imitator 142 that provides access to requested material or portions of material via the Internet 144. When the verifier 126 requests a portion of a song, or section of a data set, the CD imitator 142 transforms the request into a download request from the remote site 140, and the requested section is provided to the renderer 122, as if it was provided from the CD 130. Assuming that, for practical purposes, the verifier 126 will be configured to only check for a few sections in an album, the use of the CD imitator 142 will result in a substantially reduced amount of data transfer, compared to the downloading of the entire album, and thus preferable for the illicit download of select songs.

In accordance with this invention, the processor 120 includes a timer 128 that is configured to measure the time between a request from the verifier 126 and a response from an external source, either the actual CD 130, or the remote source 140, to facilitate an assessment by the verifier 126 of the physical proximity of the source of the response. In a preferred embodiment, the verifier 126 is configured to filter or average the response times, so as to allow for minor perturbations in the response time from an authorized source 130, while still being able to distinguish a response from a physically remote source 140. For example, using conventional statistical techniques, the verifier 126 may continue to request sections from the unknown source until a statistically significant difference from the expected response time of a local source 130 is detected. In a simpler embodiment, if the response time is below a delay threshold N out of M times, the verifier 126 is configured to conclude that the source must be local. These and other techniques for assessing physical proximity based on temporal proximity will be evident to one of ordinary skill in the art in view of this disclosure.

The principles of this invention are applicable to other applications as well. In an analogous application, for example, the renderer 122 and access device 132 may be challenge-response devices that are configured to exchange security keys, using for example, a smart card as the media 130. If an unauthorized user attempts to exchange keys by processing the challenge-responses via access to a system that is potentially able to overcome the security of the exchange, the timer 128 will be able to detect the abnormal lag between the challenge and response, and terminate the key-exchange. In like manner, if a system expects all accesses to be from terminals that are in a common physically secured area, the timer 128 will be able to detect abnormal lags if the system becomes a target of a remote access 'hacker' or other attempted accesses from outside the physically secured area.

Preferably, the verifier 126 is configured to request random source information. In the example of a CD media 130, the verifier 126 is configured to request access to randomly selected sections on the media 130 until sufficient confidence is gained whether the source is local or remote. In other applications, the verifier 126 is configured to merely monitor, and time, transactions that routinely occur between a requesting device 122 and an access device 132, to detect abnormally long response times. In other applications, the verifier 126 may merely control the order of occurrence of routine data access requests. For example, when reading information from an user's identification device, the verifier 126 may be configured to sometimes ask for the user's name first, identification number next, fingerprint next, and so on; at a next session, the verifier 126 may ask for the identification number first, a voiceprint next, and so on, thereby preventing a prerecorded sequence of responses. Similarly, in an application intended to prevent the downloading of data from a remote site, the verifier 126 in the example of FIG. 1 may merely request portions of the requested data in a different order sequence, to determine whether the requested data is local or remote. In like manner, to prevent the unauthorized download of information from a network, the verifier and time may be placed at the remote site, and configured to measure the transport time of the data. For example, in a conventional network having error-detection capabilities, the verifier may be configured to purposely transmit erroneous data, or an erroneous sequence of data, and measure the time duration until a request-for-retransmission occurs. If the receiving site is local, the request-for-retransmission should occur substantially quicker than if the receiving site is remote. In this example, the erroneous transmission constitutes a "requests" for a "response" from the receiving system. These and other timing schemes will be evident to one of ordinary skill in the art.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented in the context of detecting responses that are abnormally slow, the principles of the invention can also be applied for detecting responses that are abnormally fast. For example, if a system is configured to read information from a magnetic strip on a card, there is an expected lag associated with the swiping of the card. If the information is provided without this lag, for example, from a computer that is configured to bypass the magnetic strip reader, a security alert may be warranted. These and other system configuration and optimization features will be evident to one of ordinary skill in the art in view of this disclosure, and are included within the scope of the following claims.

I claim:

1. A security system for protecting source information from being illicitly copied from a remote location, the security system comprising:
- a processor and an access device configured to execute a challenge-response protocol between them, during which protocol a secret key is exchanged;
- a timer configured to measure a time-lag between a challenge and a response, where said challenge is sent from said processor to said access device during said challenge-response protocol and said response is received from said access device at said processor; and
- a verifier configured to cause the protocol to be aborted if the measured time-lag is greater than an expected time-lag between said challenge and response during said challenge-response protocol and,
- wherein said verifier is configured to continually request randomly selected portions of said source information to be protected, in more than one of a plurality of predetermined order sequences until the verifier is able to determine statistically whether the access device accessing said source information in response to said verifier request is local or remote.

2. The security system as claimed in claim 1, wherein a difference between the measured time-lag and the expected time-lag is correlated to a physical proximity between said processor making said requests and said access device supplying said responses.

3. The security system as claimed in claim 1, wherein an assessment of the measured time-lags determines whether one or more of the responses were communicated via a network connection.

4. A security system for protecting source information from being illicitly copied from a remote location, the security system comprising:
- a processor and an access device configured to execute a challenge-response protocol between them, during which protocol a secret key is exchanged;
- a timer configured to measure a time-lag between a challenge sent by the processor and a corresponding response received from the access device during said protocol; and
- a verifier configured to cause the protocol to be aborted if the measured time-lag exceeds an expected time-lag in N out of M trials; and
- wherein said verifier is configured to continually request randomly selected portions of source information in at least M predetermined order sequences until the verifier is able to determine statistically whether the access device is local or remote, wherein said M is greater than one.

5. The security system as claimed in claim 4, wherein the selected portions of source information are randomly selected in at least one of a plurality of predetermined order sequences to determine whether the access device is local or remote.

6. The security system as claimed in claim 4, wherein a difference between the measured time-lag and the expected time-lag is correlated to a physical proximity between said processor of one or more requests and said access device of one or more responses.

7. The security system as claimed in claim 4, wherein an assessment of the measured time-lags determines whether one or more of the responses were communicated via a network connection.

8. A security system comprising:
- a processor and an access device configured to execute a challenge-response protocol between them, during which protocol a secret key is exchanged;
- a timer configured to measure a time-lag between a challenge sent by the processor and a corresponding response received from the access device during said protocol; and
- a verifier configured to cause the protocol to be aborted if the measured time-lag is greater than an expected time-lag between a challenge of said processor and a corresponding response from the access device; and
- wherein said verifier is configured for controlling the order of occurrence of continual routine data requests by the processor in at least two of a plurality of predefined order sequences until the verifier is able to determine statistically whether the access device attempting to access a protected source information is local or remote.

9. The security system as claimed in claim 8, wherein a difference between the measured time-lag and the expected time-lag is correlated to a physical proximity between said processor of one or more requests and said access device of one or more responses.

10. The security system as claimed in claim 8, wherein an assessment of the measured time-lags determines whether one or more of the responses were communicated via a network connection.

* * * * *